Dec. 16, 1941.   C. F. A. WAGSTAFFE   2,266,454
WIRELESS DIRECTION FINDING SYSTEM
Filed June 9, 1938   2 Sheets-Sheet 2

INVENTOR
C.F.A. WAGSTAFFE
BY
ATTORNEY

Patented Dec. 16, 1941

2,266,454

UNITED STATES PATENT OFFICE 2,266,454

WIRELESS DIRECTION FINDING SYSTEM

Charles Frederick Allen Wagstaffe, London, England, assignor to International Standard Electric Corporation, New York, N. Y.

Application June 9, 1938, Serial No. 212,658
In Great Britain July 9, 1937

4 Claims. (Cl. 250—11)

This invention relates to radio direction finding apparatus of the type employing angularly disposed stationary aerials as for example, Adcock direction finders.

One of the limitations as regards sensitivity and range, with this type of direction finder, is due to the effective pick-up of the aerial system, taken as a whole, being small. This arises from the fact that each pair of aerials is connected at the goniometer or other detecting arrangement in such a way that the current flowing in the detecting device is due to the vectorial difference of signals from the two aerials of the pair.

For a signal (ground wave) arriving along the line joining the two aerials of a pair the magnitude of the difference vector for that pair is proportional to:

$$2E \sin\left(\frac{\pi d}{\lambda}\right)$$

where
$d=$ distance between the aerials
$E=$ the signal E. M. F. in one aerial alone.

If $d=0.14\lambda$, the vector is proportional to 0.85 E. It is clear that as $d/\lambda$ increases the vector does also until it reaches a maximum when $d/\lambda=\frac{1}{2}$.

However, with ordinary systems of indication, using a goniometer or an oscillograph, it is not permissible to increase $d/\lambda$ beyond a certain figure, for otherwise an error is introduced in the indicated bearing. This error is octantal in nature and, in order to limit it to $\pm\frac{1}{2}°$ on a ground wave, it can be shown that $d/\lambda$ must not exceed about 0.14. For a downcoming wave and a given value of $d/\lambda$ the error is smaller and depends upon the angle of incidence of the downcoming wave. So that exceeding the figure mentioned for $d/\lambda$ and correcting for the error by calibration is not possible because of the varying nature of the error with varying angle of incidence.

The object of the present invention is to increase the effective pick-up without introducing error. It should, of course, be understood that the pick-up can be increased in this way by increasing the actual height of the aerials, but there is a practical limit to this course on account of cost in the case of long waves and on account of electrical reasons on short waves.

According to the present invention, it is proposed to use three or more pairs of aerials spaced equally round a circle. These are connected to a goniometer with a number of field windings equivalent to the number of pairs of aerials.

Figure 1:
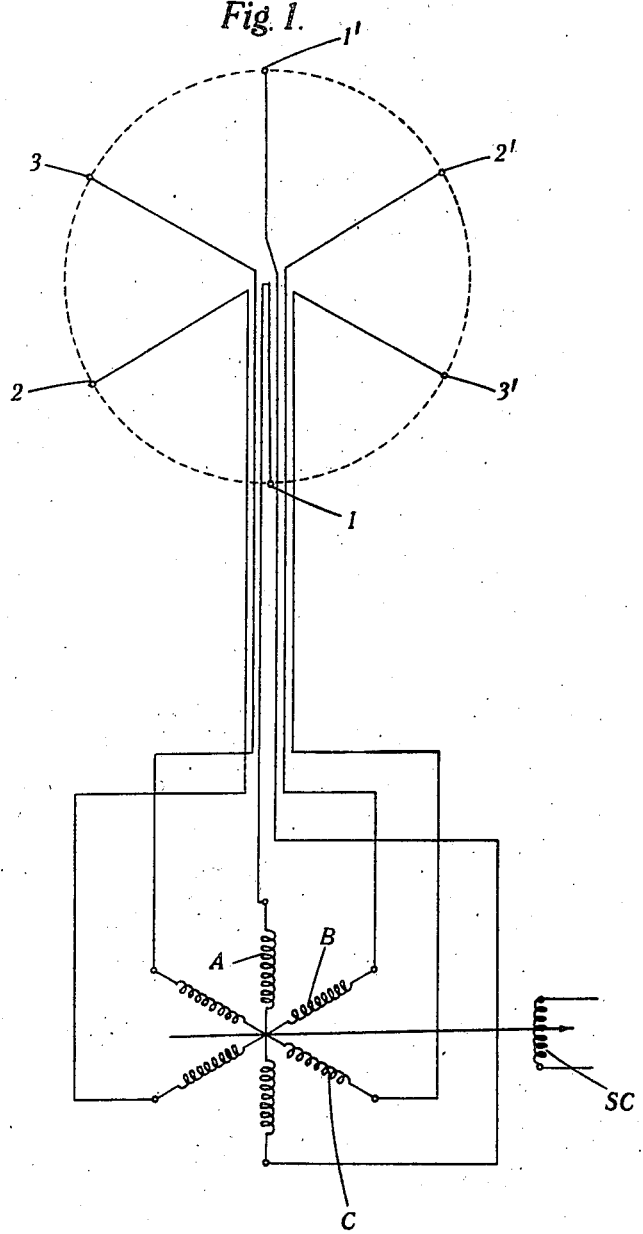
Figure 2:
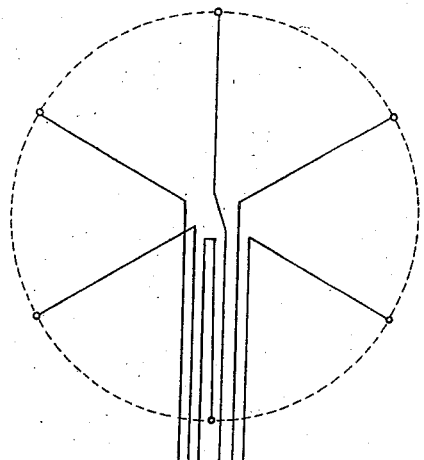
Figure 3:
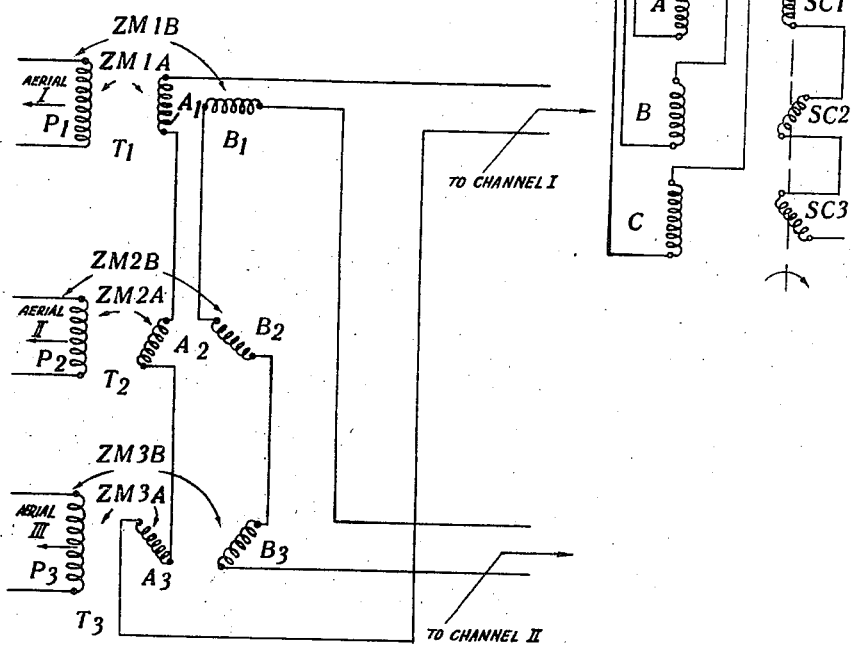

Three embodiments of the invention are illustrated in the accompanying drawings, in which; Fig. 1 shows an arrangement using a goniometer with a single search coil; Fig. 2 shows an arrangement similar to Fig. 1 in which separate search coils are used; and Fig. 3 shows a search coil arrangement permitting conversion of three channels into two channels.

In Fig. 1 is shown a three-pair arrangement comprising three pairs of aerials 1, 1', 2, 2' and 3, 3' and three field coils, A, B, C associated with a single search coil SC. Alternatively, the goniometer may be built up in three separate sections consisting of three field coils A, B, C and three search coils, SC1, SC2, SC3, the latter connected in series or parallel and mounted on a common spindle, as shown in Fig. 2 (series arrangement). For the purpose of illustrating the method, connections of a simple kind have been shown between the aerials and goniometer field coils. It must, of course, be understood that any usual system can be used here.

It can be shown that with such an arrangement, if the spacing between aerials of a pair is increased to give the maximum possible total signal, i. e. to $\lambda/2$ the maximum error due to this large spacing is less than $\frac{1}{2}°$. The difference vector previously mentioned will now be proportional to 2E. In addition to this gain there is also a gain due to more energy being absorbed from the signal wave by the larger number of aerials. For a ground wave the total gain over the orthodox system with 0.14 λ spacing will be approximately 10 db. For a downcoming ray of angle of incidence 45° (where the effective spacing is reduced), the gain will be approximately 11.5 db. All of this gain is available for giving increased sensitivity and thus increased range where static level is not the limiting factor.

By using four pairs of aerials or more, the maximum error is still further decreased though, as mentioned, three pairs give so small a maximum error that further reduction here is not of any practical advantage. However, four pairs will give further pick-up and also make it possible to use, if desired, two goniometers of standard type with search coils in series or parallel and spindles coupled and field systems set at 45° to each other. It is also possible with four pairs to increase the spacing to greater than λ/2 to, for example, 0.75 λ, without exceeding $\frac{1}{2}°$ of error (under the worst conditions, i. e. on a ground wave) so that with a downcoming wave the effective spacing is more nearly equal to λ/2 and a still greater gain over the usual type of aerial system is obtained. This arrangement would be useful for short wave long distance direction finding.

In an orthodox manner an extra aerial can be employed in order to determine the sense of the bearing.

The aerial system of Figs. 1 and 2 can be used with an oscillograph indicator by using three separate amplifying channels and an oscillograph with three pairs of deflecting plates with deflecting axes at 0°, 120° and 240°. Alternatively, the three channels conveying the bearing information from the aerials can be transformed into two channels for connecting to an orthodox two-amplifier system in order to produce the bearing indication on an oscillograph. Again, alternatively and preferably the two channels can be connected to a single amplifier arrangement as described in United States application Ser. No. 209,186, filed May 21, 1938, Patent No. 2,213,874, granted Sept. 3, 1940.

One type of circuit for converting from three channels to two channels is shown in Fig. 3, though many others can be devised, all, however, depending upon the same general principle. Along the same lines circuits can be produced for converting to two channels from any number of aerial pairs and associated channels.

In Fig. 3, $T_1$, $T_2$ and $T_3$ are three special transformers in which the secondaries A and B have zero direct coupling between each other and in which the remaining couplings are as follows:

$$Z_{M1A} = Z_M$$

$$Z_{M1B} = 0$$

$$Z_{M2A} = \frac{Z_M}{2}$$

$$Z_{M2B} = \sqrt{\frac{3}{2}} Z_M$$

$$Z_{M3A} = \frac{Z_M}{2}$$

$$Z_{M3B} = -\sqrt{\frac{3}{2}} Z_M$$

The primaries $P_1$, $P_2$ and $P_3$ are identical and also of the secondaries $A_1 = A_2 = A_3 = B_1 = B_2 = B_3$.

It should be noted that, apart from the increase of pick-up obtained by the system outlined, the latter has an advantage over the normal system in that it is less dependent upon a critical balance between the aerials of a pair, particularly with respect to phase. Consideration of the vector diagrams will show this.

The aerial system is also applicable for transmission, for example, to a beacon using an Adcock type aerial fed by a transmitting goniometer. For instance, a transmitting beacon of the A—N type, with approach paths of direction variable at will, would be provided by using an arrangement as Fig. 1 with the modification of an additional search coil wound on the same rotor as the first but at right angles (or at any other angle as required by the approach paths) to it. There would then be arrangements of an orthodox kind to connect the transmitter for the A periods to one rotor coil and for the N periods to the second. Such an arrangement would give a less critical balance of aerials for a given stability of equisignal lines, and a greater field strength at a given range with a given transmitter power, compared with a similar arrangement utilising a two-pair aerial system of small spacing and a goniometer having two field windings.

What is claimed is:

1. A directional radio receiving or transmitting system in which the aerial system comprises at least three pairs of aerials equally spaced around a circle and angularly related so that the planes defined thereby intersect at the center of said circle, a separate coil coupled between the aerials of each pair, and movable energy transfer means coupled to said coils comprising at least three search coils angularly disposed in the same relation to one another as the planes defined by said pairs of aerials.

2. A directional radio receiving or transmitting system according to claim 1 wherein said search coils are mounted on a common axis.

3. A directional radio receiving or transmitting system as claimed in claim 1, comprising three pairs of aerials in which the aerials of each pair are spaced apart, a distance substantially equal to one half the working wavelength.

4. A directional radio system, comprising at least three pairs of aerials equally spaced around a circle, a goniometer device comprising separate field coils connected to each pair of aerials, a corresponding plurality of angularly arranged search coils coupled respectively to each of said separate field coils, and a second corresponding plurality of search coils arranged at right angles to the respective first named search coils and coupled respectively to each of said field coils, a channel connected to said first named search coils, and a second channel connected to said second named search coils.

CHARLES FREDERICK ALLEN WAGSTAFFE.